Feb. 27, 1923.

1,446,612

R. BRENNEMAN

FISH BOX

Filed Nov.28, 1921

R. Brenneman,
Inventor.

By _____
Attorney.

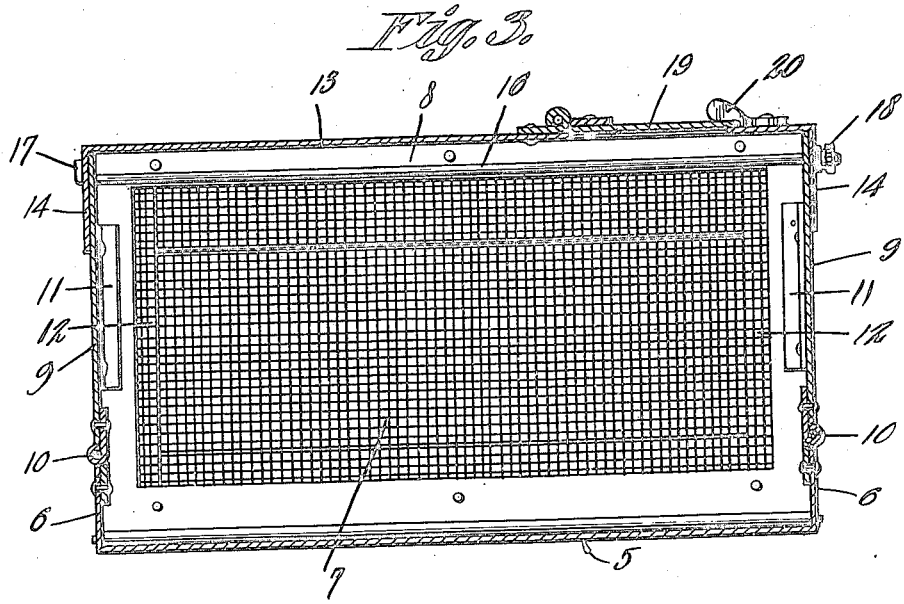
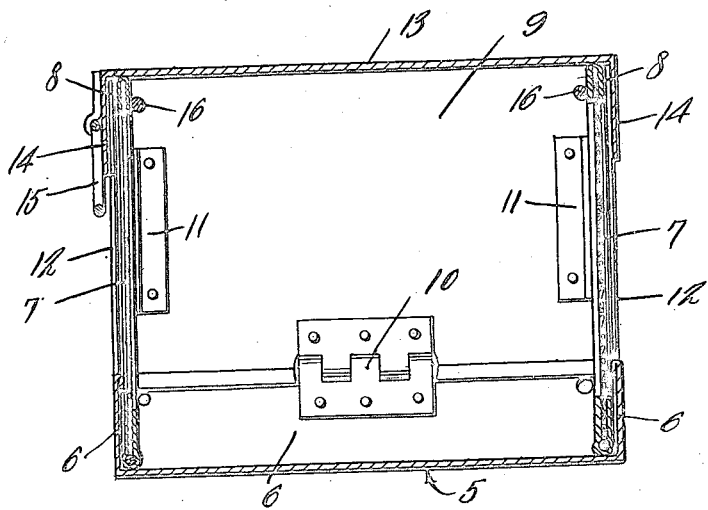
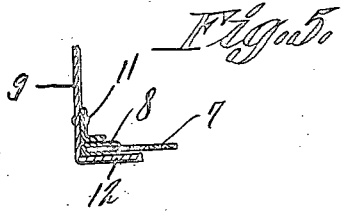

Patented Feb. 27, 1923.

1,446,612

UNITED STATES PATENT OFFICE.

ROYAL BRENNEMAN, OF FRANCESVILLE, INDIANA.

FISH BOX.

Application filed November 26, 1921. Serial No. 518,356.

*To all whom it may concern:*

Be it known that I, ROYAL BRENNEMAN, a citizen of the United States, residing at Francesville, in the county of Pulaski and State of Indiana, have invented a new and useful Fish Box, of which the following is a specification.

This invention relates to live fish or crab boxes, the primary object of the invention being to provide a collapsible box of this character which may be folded into a comparatively small and compact article to facilitate the carrying thereof when not in use as a fish retainer.

Another object of the invention is to provide a box of this character having hinged walls, novel means being provided for securing the walls in their vertical positions when the same is used for holding fish or the like.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 3 is a longitudinal sectional view through the bucket in its extended position.

Figure 4 is a sectional view taken on line 4—4 of Figure 2.

Figure 5 is a sectional view taken on line 5—5 of Figure 2.

Figure 1:
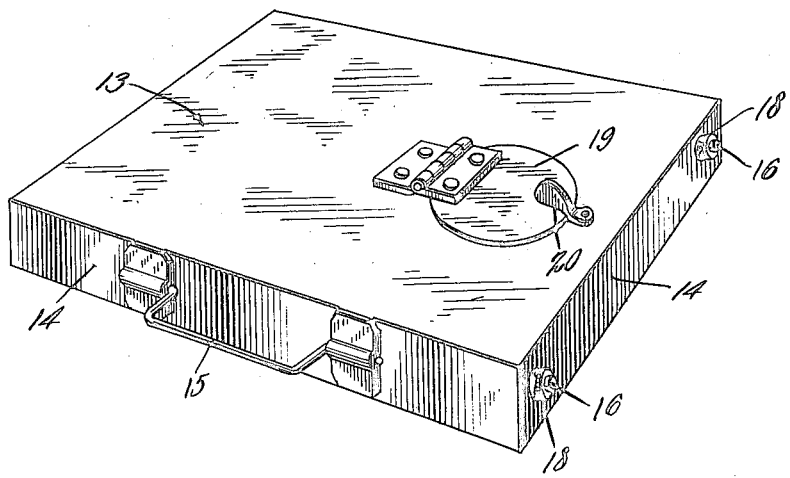
Figure 1 is a perspective view of a bait bucket constructed in accordance with the present invention, showing the same in its folded position.
Figure 2:
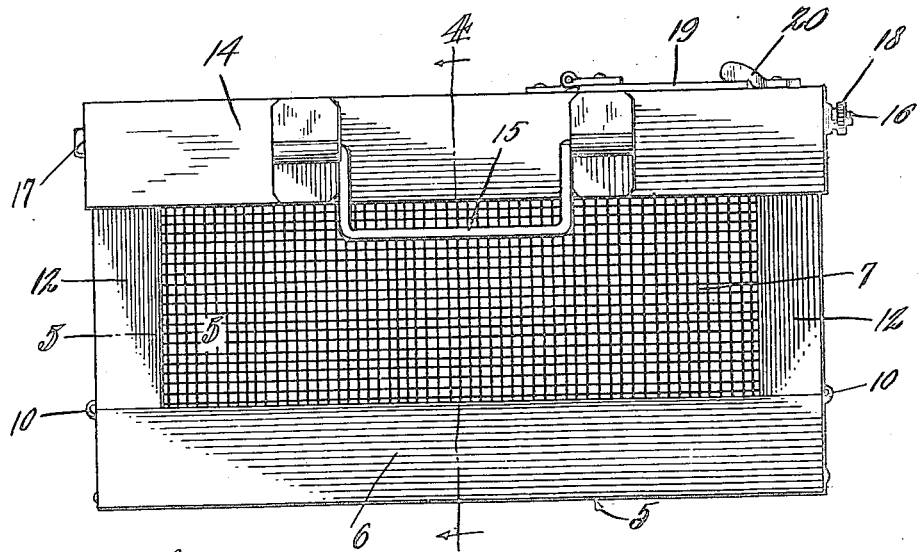
Figure 2 is a side elevational view of the same, in its extended position.

Referring to the drawings in detail, the box includes a bottom section incdicated generally by the reference character 5, the bottom being provided with an upwardly extending flange formed integral therewith.

The side sections which are indicated at 7 are formed preferably of wire mesh material having a suitable binding around the edge thereof as indicated at 8 for holding the wire mesh material straight at all times. The side sections are pivotally supported within the bottom 5 and are constructed to overlie each other when folded downwardly to a position adjacent the bottom.

End sections 9 are hingedly connected to the flange 6 as by means of the hinges 10, and as shown, these end sections 9 are provided with flanges 11 formed adjacent to the side edges thereof and disposed in spaced relation with the inwardly extending end portions 12 of the end section, to provide a clearance to accommodate the ends of the side sections 7 to hold the same in upright positions, when the device is to be used as a fish retainer.

The cover section which is indicated at 13 is provided with flanges 14 adapted to embrace the flanges 6 of the bottom section to secure the cover against lateral movement, there being provided a suitable handle 15 provided at one side of the cover, by means of which the box may be easily carried from place to place.

Formed in the flanges at the ends of the box are the openings designed to accommodate the rods 16 which have right angled ends 17 engaging one end of the bucket, the opposite ends of the rods being threaded to accommodate the nuts 18, whereby the rods 16 will be restricted from movement when the same have been positioned to secure the sections of the box in their extended or folded positions.

An opening is formed in the cover section 13, which opening is closed by the hinged closure 19, the closure being locked by means of the pivoted locking element 20. This opening permits the user to insert his hand in the box to remove a minnow or the like.

It might be further stated that in the use of this box, the same will be filled with the minnows or bait and dropped into the water, whereupon the water will pass into the box through the mesh of the side walls 7.

When the box is to be carried from place to place, the side and end walls thereof are hinged downwardly, and the cover section 13 positioned over the bottom section 5 as shown by Figure 1 of the drawings. When the cover section and bottom section have been placed in this position, the rods 16 are positioned, and the nuts 18 secured thereon to hold the bottom section and cover section in a folded position.

It is obvious that when the box is unfolded, the side and end walls are hinged upwardly and the cover section 13 moved to a position as disclosed by Figure 3 of the drawings, whereupon the securing rods 16 may be positioned to hold the side and end walls in their extended positions.

Having thus described the invention, what is claimed as new is:—

A folding box including a bottom section comprising upwardly extending side and end flanges, hinged side and end members, a cover including depending side and end flanges, adapted to embrace the upper ends of the side and end members of the box, said flanges having openings, securing rods extending through the openings and having threaded extremities, securing nuts on the ends of the rods for securing the box in its extended or folded position.

In testimony that I claim the foregoing as my own, I have hereto affixed my signature in the presence of two witnesses.

ROYAL $\overset{\text{his}}{\underset{\text{mark}}{\times}}$ BRENNEMAN.

Witnesses:
J. M. HUELFENS,
J. A. ENGLE.